US012801448B2

(12) United States Patent
Jaganmohan et al.

(10) Patent No.: US 12,801,448 B2
(45) Date of Patent: Nov. 17, 2026

(54) SYSTEMS, METHODS, AND APPARATUSES FOR IMPLEMENTING REAL-TIME RESOURCE TRANSMISSIONS BASED ON A TRIGGER IN A DISTRIBUTED ELECTRONIC NETWORK

(71) Applicant: BANK OF AMERICA CORPORATION, Charlotte, NC (US)

(72) Inventors: Karthik Jaganmohan, Neward, DE (US); Jason Enger, Phoenix, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 592 days.

(21) Appl. No.: 18/206,975

(22) Filed: Jun. 7, 2023

(65) Prior Publication Data

US 2024/0411610 A1 Dec. 12, 2024

(51) Int. Cl.
*G06F 9/50* (2006.01)

(52) U.S. Cl.
CPC .................................. *G06F 9/5055* (2013.01)

(58) Field of Classification Search
CPC ........ G06F 1/00–2221/00; G06Q 10/00–50/00
USPC ................................................ 705/7.11–7.42
See application file for complete search history.

(56) References Cited

U.S. PATENT DOCUMENTS 4,341,951 A 7/1982 Benton
5,247,575 A 9/1993 Sprague
5,495,609 A 2/1996 Scott
5,590,038 A 12/1996 Pitroda
5,903,830 A 5/1999 Joao
6,128,624 A 10/2000 Papierniak
6,311,169 B2 10/2001 Duhon
7,024,385 B1 4/2006 Adcock
7,376,603 B1 5/2008 Mayr
(Continued)

FOREIGN PATENT DOCUMENTS

CN 100573606 C 12/2009
KR 102090039 B1 3/2020
(Continued)

*Primary Examiner* — Alan S Miller
(74) *Attorney, Agent, or Firm* — Moore & Van Allen PLLC; Lauren M. Stokes

(57) ABSTRACT

Systems, computer program products, and methods are described herein for implementing real-time resource transmission based on a trigger in a distributed electronic network. The present invention is configured to identify a resource advance account; identify a resource surplus associated with the resource advance account; identify, based on the resource surplus, a trigger comprising data of the resource surplus; determine whether the resource advance account is associated with a resource storage account, wherein, in an instance where the resource advance account is associated with the resource storage account, identify the resource storage account; determine, in response to identifying the resource storage account, whether the resource storage account is associated with an electronic resource storage account; and initiate, based on the identification of the electronic resource storage account identifier, a resource transmission based on the resource surplus to the electronic resource storage account associated with the electronic resource storage account identifier.

15 Claims, 7 Drawing Sheets

(56) References Cited

U.S. PATENT DOCUMENTS

| | | | | |
|---|---|---|---|---|
| 8,145,556 | B2 | 3/2012 | Tealdi | |
| 8,825,872 | B2 | 9/2014 | Reisman | |
| 9,858,595 | B2 | 1/2018 | Barnes, Jr. | |
| 10,299,307 | B2 | 5/2019 | Dua | |
| 11,610,208 | B2 * | 3/2023 | Riechers | G06Q 20/202 |
| 11,636,475 | B1 * | 4/2023 | Calinog | G06Q 30/0633 705/26.8 |
| 11,823,171 | B1 * | 11/2023 | Ketharaju | G06Q 20/326 |
| 2007/0022049 | A1 * | 1/2007 | Diveley | G06Q 30/0234 705/40 |
| 2008/0242423 | A1 * | 10/2008 | Kerr | G07F 17/3276 463/42 |
| 2010/0274723 | A1 * | 10/2010 | Joao | G06Q 30/06 705/44 |
| 2011/0161218 | A1 | 6/2011 | Swift | |
| 2014/0114853 | A1 * | 4/2014 | Guedj | G06Q 20/12 705/44 |
| 2020/0005595 | A1 | 1/2020 | Nelson | |
| 2020/0250727 | A1 | 8/2020 | Fredrich | |
| 2021/0081984 | A1 * | 3/2021 | Yamashita | G06Q 20/102 |
| 2021/0109847 | A1 * | 4/2021 | Jaganmohan | G06F 11/3688 |
| 2022/0122048 | A1 * | 4/2022 | Qiang | G06Q 40/02 |
| 2022/0261774 | A1 * | 8/2022 | Malhotra | G06Q 20/10 |
| 2022/0292468 | A1 * | 9/2022 | Yan | G06Q 20/02 |
| 2023/0045946 | A1 * | 2/2023 | Duane | G06Q 20/351 |
| 2023/0105432 | A1 * | 4/2023 | Lauer | G06Q 20/10 705/39 |
| 2023/0252467 | A1 * | 8/2023 | Calinog | G06Q 30/0633 705/26.8 |
| 2023/0401558 | A1 * | 12/2023 | Hecht | G06Q 20/3265 |
| 2024/0354881 | A1 * | 10/2024 | Bowdon | G06Q 20/023 |

FOREIGN PATENT DOCUMENTS

| | | | |
|---|---|---|---|
| RU | 2549510 | C1 | 4/2015 |
| WO | 199601079 | | 4/1996 |

* cited by examiner

SYSTEMS, METHODS, AND APPARATUSES FOR IMPLEMENTING REAL-TIME RESOURCE TRANSMISSIONS BASED ON A TRIGGER IN A DISTRIBUTED ELECTRONIC NETWORK

FIELD OF THE INVENTION

The present invention embraces a system for implementing real-time resource transmissions based on a trigger in a distributed electronic network.

BACKGROUND

Data transmissions, including resource transmissions, inside and outside of electronic networks may be more difficult to track than ever. Further, there exists an issue where surpluses may need to be zeroed and/or nulled, but where such resource transmissions for the nulling of the surplus may have already occurred either electronically and/or outside electronic networks. Importantly, and in order to make these determinations of whether a prior resource transmission has already been generated, data regarding potential resource transmissions must be gathered from a variety of networks, data sources, databases, datastores, and/or the like, searched, compared, and correlated, before a new resource transmission can be generated. Thus, there exists a need for a system to accurately, efficiently, dynamically, and securely generate resource transmissions within an electronic network based on a determination that prior resource transmissions (inside and outside of an electronic network) have not already occurred.

Applicant has identified a number of deficiencies and problems associated with implementing real-time resource transmissions based on a trigger in a distributed electronic network. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing real-time resource transmissions based on a trigger is provided. In some embodiments, the system may comprise: a memory device with computer-readable program code stored thereon; at least one processing device, wherein executing the computer-readable code is configured to cause the at least one processing device to perform the following operations: identify a resource advance account; identify a resource surplus associated with the resource advance account; identify, based on the resource surplus, a trigger comprising data of the resource surplus; determine whether the resource advance account is associated with a resource storage account, wherein, in an instance where the resource advance account is associated with the resource storage account, identify the resource storage account; determine, in response to identifying the resource storage account, whether the resource storage account is associated with an electronic resource storage account, wherein, in an instance where the resource storage account is associated with the electronic resource storage account, identify an electronic resource storage account identifier; and initiate, based on the identification of the electronic resource storage account identifier, a resource transmission based on the resource surplus to the electronic resource storage account associated with the electronic resource storage account identifier.

In some embodiments, the system may further comprise: determine, in response to identifying the resource storage account, whether the resource storage account is associated with an electronic resource storage account, wherein, in an instance where the resource storage account is not associated with the electronic resource storage account, identify a resource transmission location associated with the resource advance account; generate, based on the resource transmission location, a resource transmission token comprising the resource surplus; and transmit the resource transmission token to the resource transmission location.

In some embodiments, the system may comprise automatically, based on the resource transmission based on the resource surplus, update the resource advance account.

In some embodiments, the system may comprise: determine whether a resource surplus transmission index comprising the resource advance account has been generated, wherein, in an instance where the resource surplus transmission index comprising the resource advance account has been generated, update the resource surplus transmission index with the resource transmission based on the resource surplus, or wherein, in an instance where the resource surplus transmission index comprising the resource advance account has not been generated, generate the resource surplus transmission index with the resource transmission based on the resource surplus. In some embodiments, the resource surplus transmission index comprises at least one of the resource transmission based on the resource surplus or a resource transmission token. In some embodiments, the system may comprise: access at least one of the resource surplus transmission index or a resource transmission database; and determine, based on accessing at least one of the resource surplus transmission index or a resource transmission database, whether a resource transmission token has been generated for the resource surplus, wherein, in an instance where the resource transmission token has been generated for the resource surplus, halt the initiation of the resource transmission to the electronic resource storage account, or wherein, in an instance where the resource transmission token has not been generated for the resource surplus, allow the initiation of the resource transmission to the electronic resource storage account.

In some embodiments, the resource surplus is associated with the resource advance account for a pre-determined threshold period. In some embodiments, the system may comprise: generate, based on the resource surplus being associated with the resource advance account for the pre-determined threshold period, a resource transmission trigger for the resource surplus; and initiate, based on the resource transmission trigger, the resource transmission to the electronic resource storage account.

In some embodiments, the resource advance account and the resource storage account are operated by an entity.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
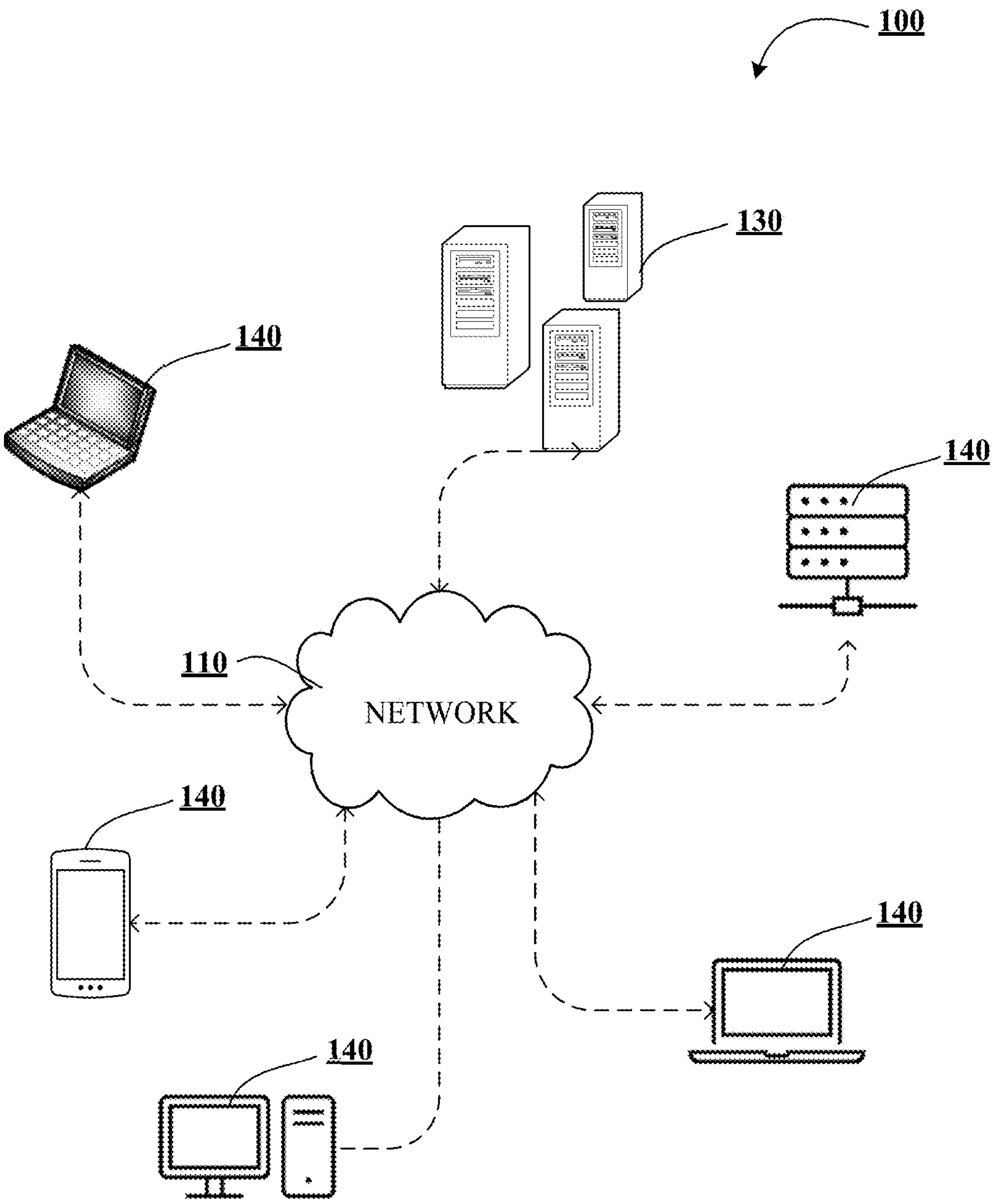
Figure 1B:
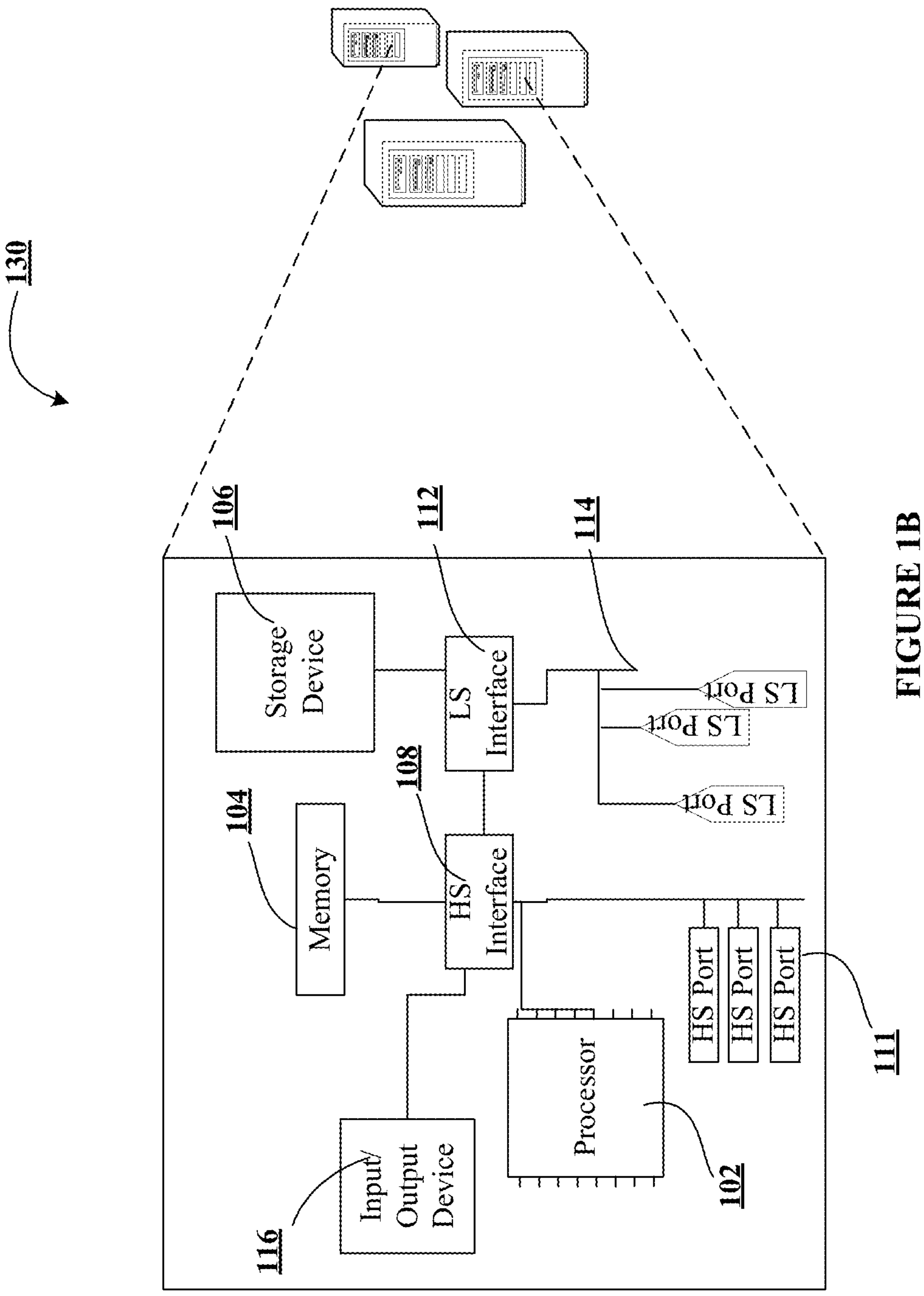
Figure 1C:
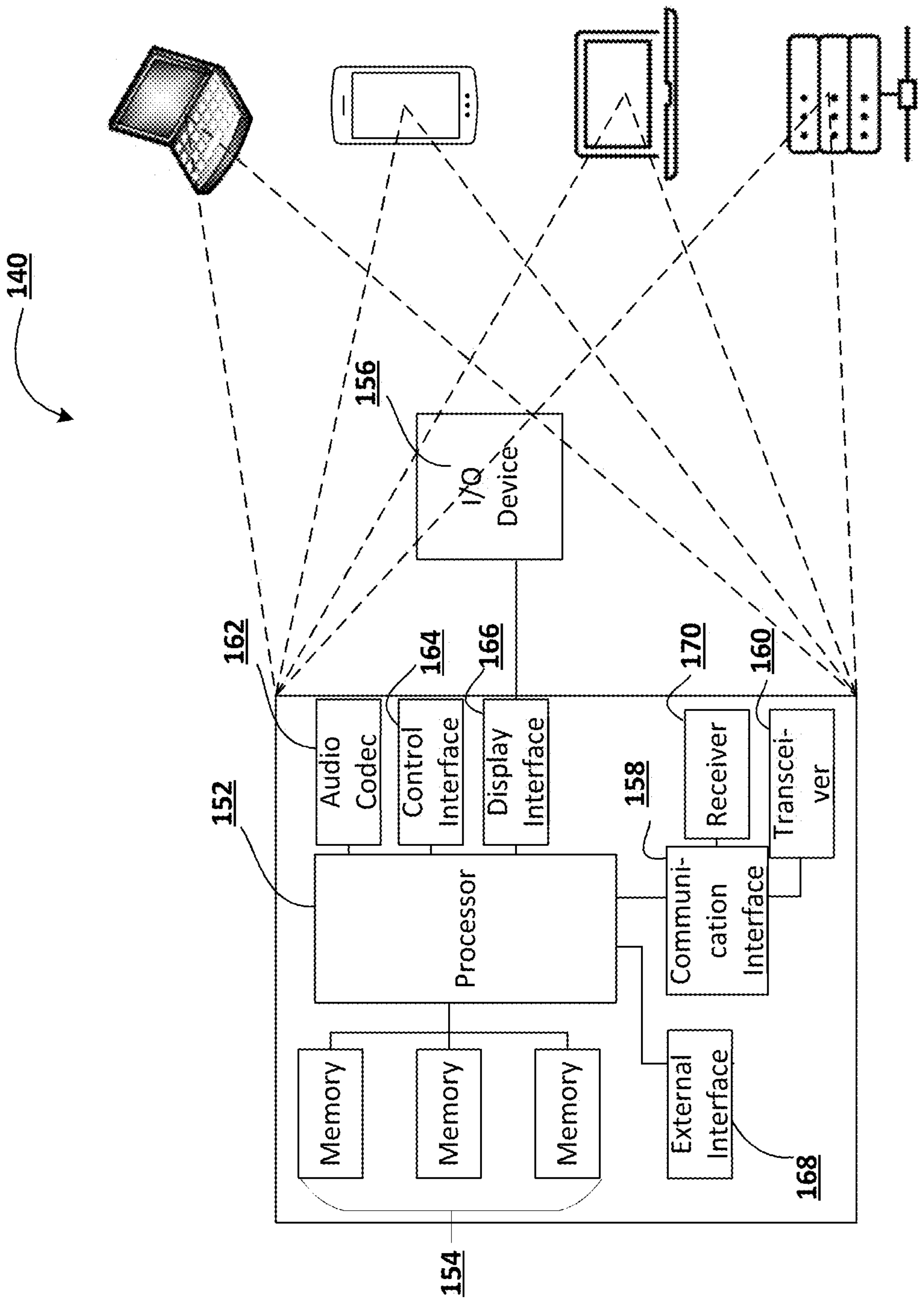
Figure 2:
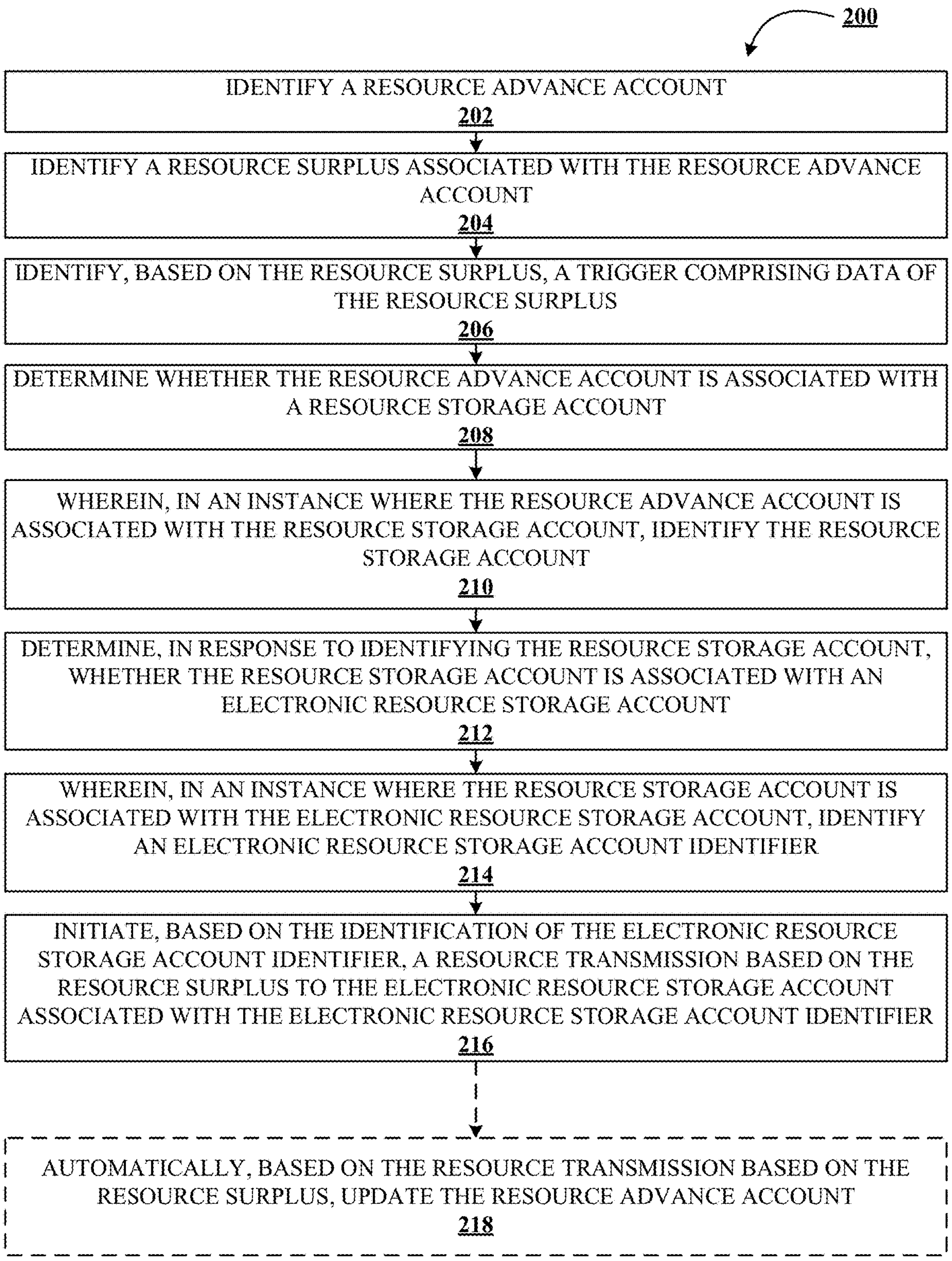
Figure 3:
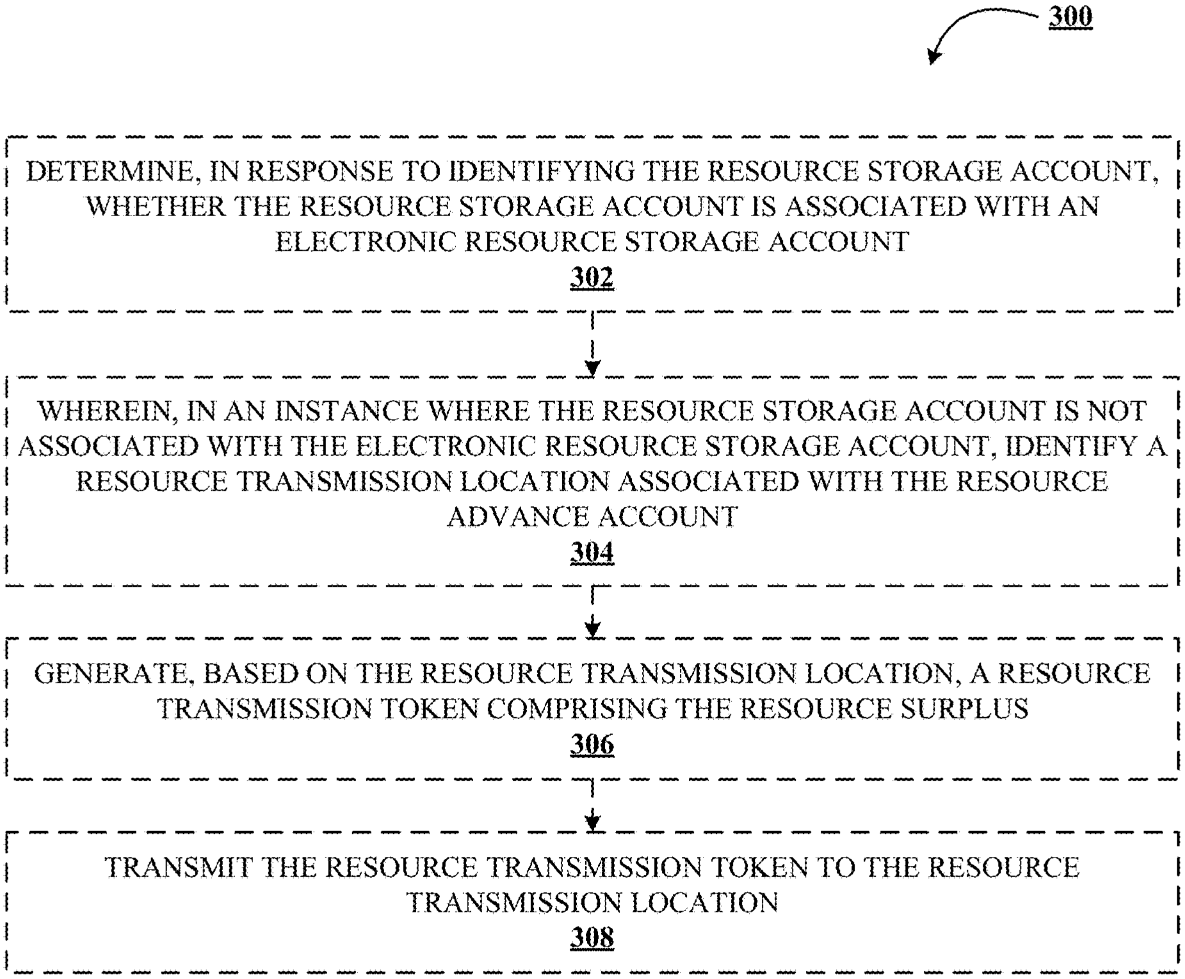
Figure 4:
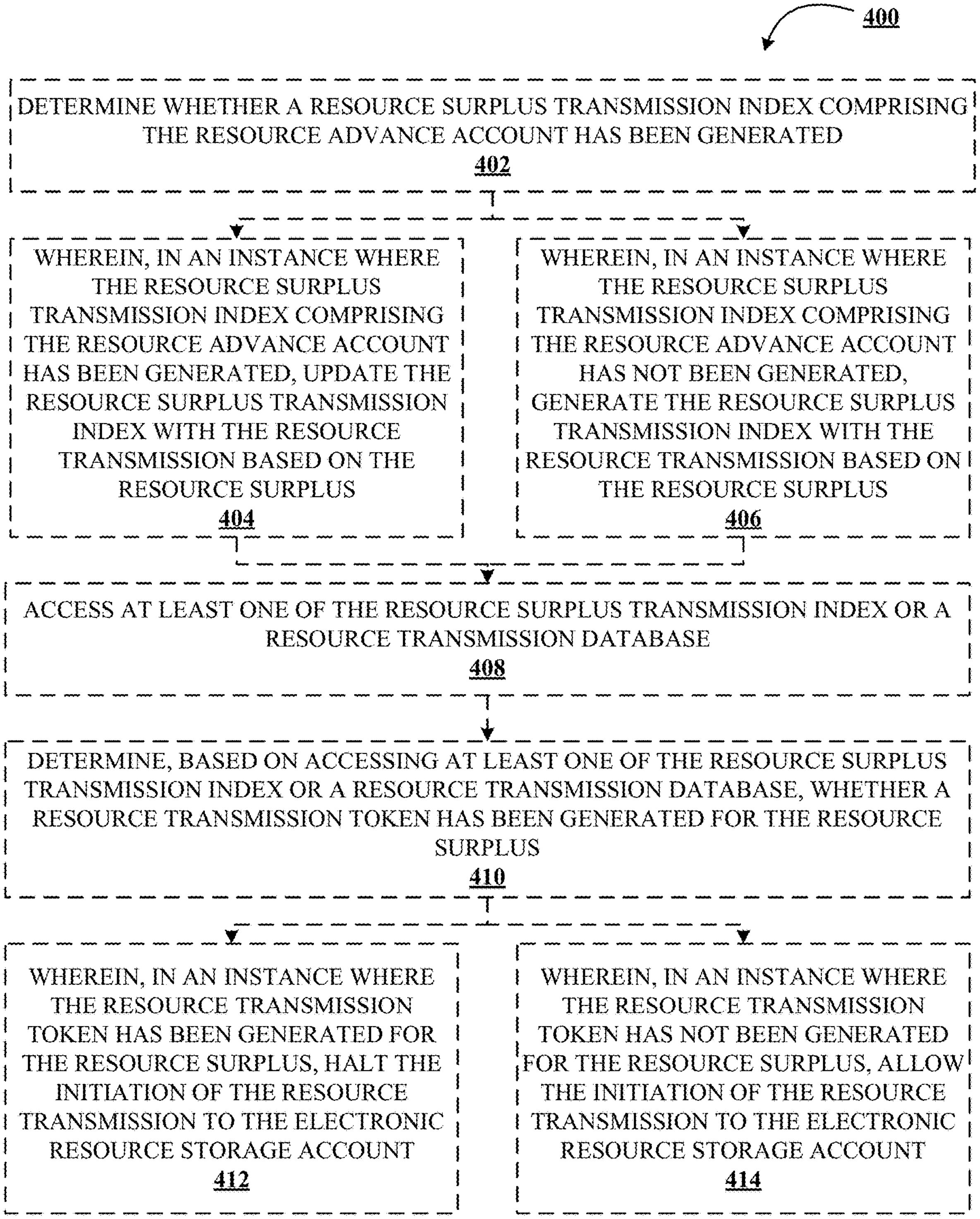
Figure 5:
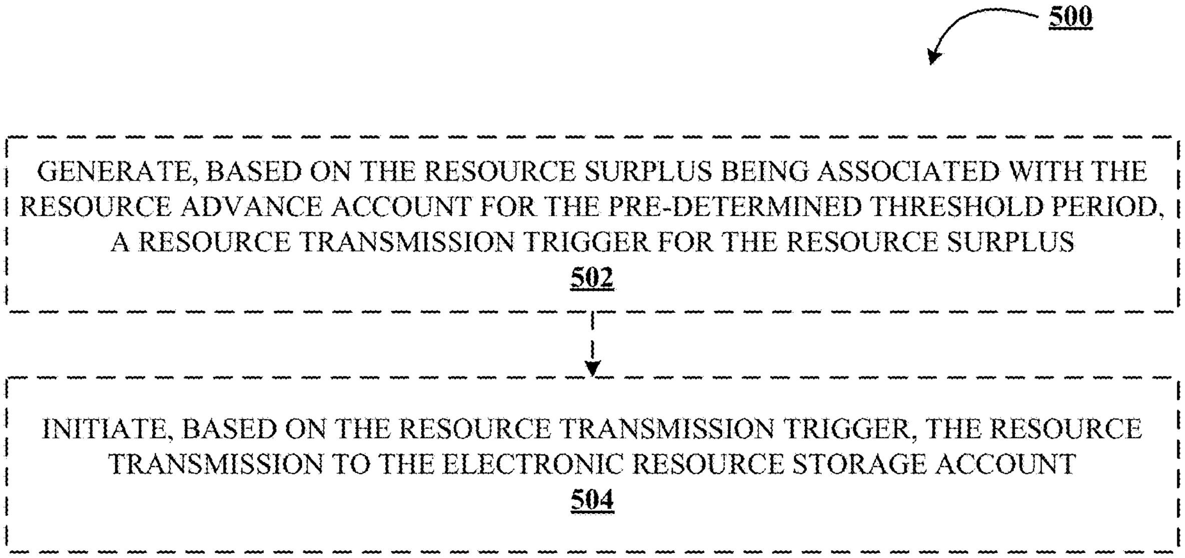

Having thus described embodiments of the invention in general terms, reference will now be made the accompanying drawings, wherein:

FIGS. 1A-1C illustrates technical components of an exemplary distributed computing environment for implementing real-time resource transmissions based on a trigger in a distributed electronic network, in accordance with an embodiment of the disclosure;

FIG. 2 illustrates a process flow for implementing real-time resource transmissions based on a trigger in a distributed electronic network, in accordance with an embodiment of the disclosure;

FIG. 3 illustrates a process flow for transmitting the resource transmission token to the resource transmission location, in accordance with an embodiment of the disclosure;

FIG. 4 illustrates a process flow for determining whether a resource transmission token has been generated or generating a resource transmission token, in accordance with an embodiment of the disclosure; and FIG. 5 illustrates a process flow for initiating the resource transmission to the electronic resource storage account, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system, to generate a resource transmission (e.g., from the resource advance account, from the resource storage account, and/or the like). In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. In some embodiments, such interactions may comprise the transmission between user accounts of a resource, transmission between resource accounts (e.g., resource advance account and resource storage account) of a resource or resource surplus, and/or the like. For example, an interaction comprising a resource may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource distribution," "resource transmission," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "resource transmission token" may refer to a payment vehicle, such as a check, an electronic credit or a debit card. The resource transmission token may not be a "check" at all and may instead be account identifying information stored electronically and reproduced non-electronically (e.g., by print) and sent to a user associated with resource advance account (e.g., a residential address, a work address, and/or the like) such as payment credentials or tokens/aliases associated with a digital wallet, or account identifiers stored by a mobile application.

As mentioned hereinabove, data transmissions, including resource transmissions, inside and outside of electronic networks may be more difficult to track than ever. Further, there exists an issue where resource surpluses may need to be zeroed and/or nulled, but where such resource transmissions for the nulling of the resource surplus may have already occurred either electronically and/or outside electronic networks. Importantly, and to make these determinations of whether a prior resource transmission has already been generated, data regarding potential resource transmissions must be gathered from a variety of networks, data sources, databases, datastores, and/or the like, searched, compared, and correlated, before a new resource transmission can be generated. Such data may additionally need to be standardized after searching from different databases, datastores, and/or the like, such that the data retrieved can be read within a particular network or by a particular reviewing entity. Thus, there exists a need for a system to accurately, efficiently, dynamically, and securely generate resource transmissions within an electronic network based on a determination that prior resource transmissions (inside and outside of an electronic network) have not already occurred. For instance, and where a resource advance account (such as a resource credit account) comprises a surplus (e.g., a negative resource amount indicating a resource is due back to the user of the resource advance account), there exists a need for a system to determine whether a resource transmission has already been generated and/or transmitted to the user, and where such a resource transmission has not already occurred, generate a real-time resource transmission within an electronic network to allow a dynamic and real-time solution across a distributed network.

Accordingly, the present disclosure provides for identifying a resource advance account (such as a credit account); identifying a resource surplus (e.g., a negative surplus amount) associated with the resource advance account; identifying, based on the resource surplus, a trigger comprising data of the resource surplus; and determining whether the resource advance account is associated with a resource storage account (e.g., a resource storage account owned by the same user that is associated with the resource advance account), wherein, in an instance where the resource advance account is associated with the resource storage account. In some embodiments, the present disclosure may additionally provide for identifying the resource storage account (associated with the resource advance account); determining, in response to identifying the resource storage account, whether the resource storage account is associated with an electronic resource storage account (such as a resource storage account within an electronic network, like a real-time resource transmission distributed network), wherein, in an instance where the resource storage account is associated with the electronic resource storage account, identify an electronic resource storage account identifier; and initiating, based on the identification of the electronic resource storage account identifier, a resource transmission based on the resource surplus to the electronic resource storage account associated with the electronic resource storage account identifier.

What is more, the present disclosure provides a technical solution to a technical problem. As described herein, the technical problem includes the accurate and secure determination and initiation of a resource transmission within an electronic network for a resource surplus. The technical solution presented herein allows for the accurate, secure, dynamic, and efficient resource transmission within a distributed electronic network by determining whether an electronic resource storage account is available for the user of the resource advance account, which further comprises the collection, consolidation, and conversion of the resource transmissions from different sources into a standardized format. In particular, the real-time resource transmission system is an improvement over existing solutions to the resource transmissions for resource surpluses both within and outside a distributed electronic environment, (i) with fewer steps to achieve the solution, thus reducing the amount of computing resources, such as processing resources, storage resources, network resources, and/or the like, that are being used (e.g., by generated and/or dynamically updating a resource surplus transmission index for interrogation in determining previous resource transmissions, and/or the like); (ii) providing a more accurate solution to problem, thus reducing the number of resources required to remedy any errors made due to a less accurate solution (e.g., by interrogating data of the resource advance account(s), the resource storage account(s), the electronic resource storage accounts, and the resource transmission tokens to determine resource surpluses and the nullification of the resource surplus); (iii) removing manual input and waste from the implementation of the solution, thus improving speed and efficiency of the process and conserving computing resources; (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing real-time resource transmissions based on a trigger in a distributed electronic network 100, in accordance with an embodiment of the invention. As shown in FIG. 1A, the distributed computing environment 100 contemplated herein may include a system 130 (i.e., a real-time resource transmission system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for implementing real-time resource transmissions based on a trigger in a distributed electronic network, in accordance with an embodiment of the invention. In some embodiments, a system (e.g., similar to one or more of the systems described herein with respect to FIGS. 1A-1C) may perform one or more of the steps of process flow 200. For example, a real-time resource transmission system (e.g., the system 130 described herein with respect to FIG. 1A-1C) may perform the steps of process flow 200.

As shown in block 202, the process flow 200 may include the step of identifying a resource advance account. In some embodiments, the real-time resource transmission system may identify a resource advance account based on receiving, generating, and/or identifying a trigger associated with a resource surplus of the resource advance account. For instance, and in some embodiments, the resource advance account as used herein may refer to an account associated with a user, where the resource advance account is an advance of a certain amount of a resource to the user (e.g., a credit account, a loan account, and/or the like). Such a resource advance account and its associated data may be pulled and/or data mined from the resource advance entity's database (e.g., the resource advance entity associated with the resource advance account).

In some embodiment, the real-time resource transmission system may identify the resource advance account by tracking a plurality of resource advance accounts, such as through a database that keeps up-to-date data on each resource advance account associated with an entity (such as a financial institution, a credit company, a loan company, and/or the like). Such a database may be stored remote from the real-time resource transmission system, stored with the real-time resource transmission system (such as where the real-time resource transmission system is stored within the same network as the database), and/or the like.

In some embodiments, the real-time resource transmission system may identify the resource advance account with the resource surplus by extracting—at pre-determined periods (e.g., daily, weekly, and/or the like)—data regarding each resource advance account associated with an entity through the use of a database pull from a resource transmission token completion system. Such a resource transmission token completion system may be configured to generate resource transmission tokens (such as checks) which may be transmitted to a user's physical location (i.e., resource transmission location) in order to zero the resource surplus. Additionally, and in some embodiments, the resource transmission token completion system may be configured to generate and/or update a log with each of the resource transmission tokens generated and/or transmitted, such that the real-time resource transmission system may interrogate the log to determine whether to initiate a resource transmission to an electronic resource storage account.

As shown in block 204, the process flow 200 may include the step of identifying a resource surplus associated with the resource advance account. As used herein, the resource surplus may refer to a surplus of a resource within the resource advance account. For instance, and where the resource advance account comprises a credit account, a resource surplus may appear on the credit account as a negative amount to indicate that the resource surplus is owed to the user of the resource advance account.

In some embodiments, the real-time resource transmission system may identify a resource surplus associated with the resource advance account based on at least one of tracking the resource advance account and its associated resources, receiving a trigger associated with the resource surplus, generating and identifying a resource surplus for the resource advance account, and/or the like. By way of non-limiting example, the real-time resource transmission system may track each resource advance account and its associated resource data (including any potential resource surplus and a time period for such a potential resource surplus) by tracking a plurality of resource advance accounts within an entity's network. For instance, such a resource advance account may be tracked by interrogating a database that is updated in automatically and in-real time of the data associated with the resource advance accounts. In some embodiments, the database of the resource advance accounts may be operated, updated, and/or managed by an entity associated with the resource advance account (such as a financial institution, credit entity, loan entity, and/or the like).

In some embodiments, the real-time resource transmission system itself may identify the resource surplus based on receiving a trigger associated with the resource surplus, such as a trigger transmitted to the real-time resource transmission system over a network from a resource processing center, such as a resource processing center operated and managed by an entity of the resource advance account. In some embodiments, the real-time resource transmission system may generate and identify the resource surplus by determining whether a resource advance account has a current resource surplus (e.g., a negative resource) and how long such a resource surplus has been present for the resource advance account (such as a pre-determined threshold period). Thus, and in some embodiments, the real-time resource transmission system may generate its own trigger for the resource advance once the pre-determined threshold period has been met for the resource surplus on the resource advance account.

Thus, and as described herein, the system may determine a user account's resource advance account identifier, the user account identifier, and whether the user account is associated with a resource storage account. In some embodiments, such a user account may be associated with a party ID (party identifier), whereby the party ID is an identifier associated with each individual user account associated within a particular database (such as a financial institution's database where the user account may have a resource storage account) and may be used to identify whether the resource storage account comprises a party attribute (e.g., is the user account an owner of the resource storage account, a co-owner, a borrower, a co-borrower, and/or the like). Further, the party ID may be data mined within the database of user accounts in order to determine co-relationships between each user account and their associated resource accounts. Once a party ID has been determined, the system may check whether all the user accounts with a relationship are active with an online ID enabled attribute (e.g., the user accounts comprise a digital/electronic network enablement) or are inactive with a non-online ID enabled attribute (e.g., the user account do not comprise digital or electronic network enabled and should be listed inactive).

As shown in block 206, the process flow 200 may include the step of identifying, based on the resource surplus, a trigger comprising data of the resource surplus. In some embodiments, the real-time resource transmission system may identify the trigger for the resource surplus based on identifying from a received transmission, identifying based on a generation by the real-time resource transmission system itself, and/or the like.

Additionally, and in some embodiments, the trigger herein described may comprise data of the resource surplus, such as data regarding the resource surplus amount (e.g., a number, a dollar amount, and/or the like), the length of time the resource surplus has been associated with the resource advance account (which may be compared with the pre-determined threshold period), and/or the like. In some embodiments, the trigger may only be generated after the pre-determined threshold period has been met for the length of time for the resource surplus. In some embodiments, the trigger may additionally comprise the data of whether the resource surplus has been associated with a resource transmission (such as an electronic or non-electronic means, like a check has been generated and/or sent).

As shown in block 208, the process flow 200 may include the step of determining whether the resource advance account is associated with a resource storage account. In some embodiments, the real-time resource transmission system may determine whether the resource advance account comprising the resource surplus is associated with a resource storage account. By way of non-limiting example, the resource storage account may be a resource account for storing resources that the user of the user account currently owns (e.g., is not credited toward the user), such as a debit or checking account. The real-time resource transmission system may determine the presence of a resource storage account for the resource advance account by interrogating the accounts associated with a user account identifier of the user account, whereby the accounts associated with the user account identifier may be operated and/or managed by a single entity and/or a single entity's processing center(s), such as a financial institution. By way of non-limiting example, the real-time resource transmission system may determine the resource account(s) associated with the user account identifier by interrogating the data of each user account within its own database, within a database operated and managed by an entity, by interrogating a processing center of the entity for the resource advance account, and/or the like.

In some embodiments, and where a resource advance account is not identified as being associated with the resource advance account, the real-time resource transmission system may transmit an indication to a processing center to generate a resource transmission token (such as a check, and/or the like) for the resource surplus.

Additionally, and in some embodiments, the system may determine whether the user account and/or resource account has been electronically accessed. For instance, the system may identify, for those user accounts which are electronically enabled, that a graphical user interface (GUI) ID is associated with an active status (i.e., indicating that the user account has access to an electronic resource storage account, such as a Zelle® account). However, and where the user account and/or resource account has not been electronically accessed, the system may fail to identify an association of the GUI ID with an active status and may instead identify an inactive status for the GUI ID. Such a GUI ID and associated active and/or inactive status may be data mined from the resource advance entity's database, from a resource storage entity's database, and/or the like. In some embodiments, a recent session identifier for when the user account most recently electronically accessed the resource advance account may additionally be determined from the data mining, whereby the system may be configured to disallow the resource transmission to the resource storage account (e.g., Zelle® account when the most recent access session ID is greater than a pre-determined threshold period).

In some embodiments, and where at least one of the data is missing (e.g., the resource advance account identifier, the party ID, the online ID is enabled, the active status for the GUI ID, the GUI ID, resource storage account identifier, and the session ID for the most recent session) is missing, then the system will determine the user account does not comprise a electronic resource storage account and will identify the user account as a non-digital account. Thus, and in this instance, the system will generate the resource transmission token and transmit the resource transmission token to the user account's geolocation (resource transmission location).

As shown in block 210, the process flow 200 may include the step of identifying, in an instance where the resource advance account is associated with the resource storage account, the resource storage account. By way of non-limiting example, the real-time resource transmission system may identify the resource storage account for the resource transmission which may comprise the same previously identified resource storage account associated with the resource advance account. In some embodiments, and where there are multiple resource storage accounts associated with the resource advance account, the real-time resource transmission system may identify one resource storage account for the resource transmission based on the resource storage account's associated with a real-time resource transmission distributed network (such as Zelle®, and/or the like). In some embodiments, the real-time resource transmission system may identify the resource storage account by identifying the resource storage account that is linked to the user account identifier of the resource advance account, such as where the resource storage account is identified within a database and/or an index (i.e., a resource transmission surplus index, which is described in more detail below with respect to FIG. 4) comprising resource account identifiers for each user account; identify the resource storage account from a distributed network such as a real-time resource transmission distributed network (e.g., Zelle®, and/or the like) and its associated resource accounts; and/or the like.

As show in block 212, the process flow 200 may include the step of determining, in response to identifying the resource storage account, whether the resource storage account is associated with an electronic resource storage account. By way of non-limiting example, the real-time resource transmission system may determine whether the resource storage account is associated with an electronic resource storage account, where such an electronic resource storage account may refer to a resource storage account that is part of the real-time resource transmission distributed network and can receive and transmit resource transmissions over the electronic distributed network (such as the Zelle® network). Such an electronic resource storage account may be directly linked to the resource storage account such that the resource transmissions transmitted from or received by the electronic resource transmission account can be transmitted from and/or received by the resource storage account. In some embodiments, the electronic resource transmission account may additionally be operated and/or managed by the same entity as the resource advance account and the resource storage account, such that the resource transmission for the resource surplus can be transmitted directly from the within the real-time resource transmission system by the entity for the resource advance account to the resource storage account within the real-time resource transmission distributed network.

Thus, the system may be configured to determine, after determining the user account is associated with a digital account (an electronic resource storage account such as a Zelle® account), then the system will validate the electronic resource storage account is associated with a valid electronic communication account (such as a valid email account and/or active phone number). Once validated, the system may also generate an API call to an exchange web services (EWS) account to gather data on a whether the electronic communication account is active/validated with the same electronic resource storage account on the EWS system. Thus, and where the email and/or phone number is also active with respect to the EWS, the system may validate the electronic resource storage account as being active and being properly registered with the user account and the resource advance account. Thus, and in this manner, the system may validate—such as for data security purposes and for resource transmission purposes—the electronic resource storage account before a resource transmission is generated and in order to allow the resource transmission to occur without the possibility of interference within the real-time resource transmission distributed network.

Additionally, and in some embodiments, the system may additionally determine the electronic resource transmissions that have already been transmitted to and/or from the electronic resource storage account (e.g., Zelle® transfers that have occurred). In this instance, the system can validate that the electronic resource storage account is still active and accepting resource transmissions, before allowing the current resource transmission to occur.

As shown in block 214, the process flow 200 may include the step of identifying, in an instance where the resource storage account is associated with the electronic resource storage account, an electronic resource storage account identifier. In some embodiments, the real-time resource transmission system may identify the electronic resource storage account identifier for the electronic resource storage account, such that the real-time resource transmission system may use the electronic resource storage account identifier to correctly identify the electronic resource storage account to transmit the resource transmission of the resource surplus. In some embodiments, the electronic resource storage account identifier may be transmitted with the resource transmission within the real-time resource transmission distributed network, such that the resource transmission is transmitted to the correct electronic resource storage account and can be verified by the real-time resource transmission system as such.

As shown in block 216, the process flow 200 may include the step of initiating, based on the identification of the electronic resource storage account identifier, a resource transmission based on the resource surplus to the electronic resource storage account associated with the electronic resource storage account identifier. In some embodiments, the real-time resource transmission system may initiate the resource transmission for the resource surplus to the electronic resource storage account based on identifying the electronic resource storage account identifier for the receiving electronic resource storage account. Thus, and by way of non-limiting example, the real-time resource transmission system may automatically initiate the resource transmission of the resource surplus to the electronic resource storage account once (at least) the electronic resource storage account identifier has been identified.

In some embodiments, and as shown in block 218, the process flow 200 may include the step of automatically updating, based on the resource transmission based on the resource surplus, the resource advance account. By way of non-limiting example, the real-time resource transmission system may automatically and dynamically update the resource advance account once the resource transmission has been transmitted to the electronic resource storage account, whereby the resource advance account may be updated to show the resource transmission of the resource surplus has been sent. In some embodiments, this automatic and dynamic update may comprise a zeroing of the negative amount previously indicated for the resource surplus.

As described, and as understood by a person of skill in the art, the disclosure provided herein may allow for more accurate, efficient, and secure data mining/data gathering, data aggregation, data consolidation, and data standardization (e.g., such as the index described herein), for the data associated with a resource advance account, a resource storage account, an electronic resource storage account, a user account, and/or the like, while also providing validation measures to ensure that each of the accounts described herein are still active at the time of resource transmissions. Additionally, such a system, like that described herein, may allow more accurate and efficient data gathering, consolidation, and standardization, which cuts down on the manual input and use of computing resources, where such a manual input, manual gathering of data, and manual standardization may have taken a user three to four days to complete previously. In contrast, such a system like that described herein allows for an automatic data gathering, consolidation, security measures, data standardization, resource transmission trigger to occur within one to two seconds.

FIG. 3 illustrates a process flow 300 for transmitting the resource transmission token to the resource transmission location, in accordance with an embodiment of the invention. In some embodiments, a system (e.g., similar to one or more of the systems described herein with respect to FIGS. 1A-1C) may perform one or more of the steps of process flow 300. For example, a real-time resource transmission system (e.g., the system 130 described herein with respect to FIG. 1A-1C) may perform the steps of process flow 300.

In some embodiments, and as shown in block 302, the process flow 300 may include the step of determining, in response to identifying the resource storage account, whether the resource storage account is associated with an electronic resource storage account. In some embodiments, the real-time resource transmission system may determine whether the resource storage account is associated with an electronic resource storage account, such as a resource storage account within a real-time resource transmission distributed network (e.g., the Zelle® network). Thus, and in some embodiments, the real-time resource transmission system may be configured to interrogate a distributed network, a database, an index, and/or the like, which may comprise data associated with the user accounts for resource transmissions, resource storage, and/or resource advances.

For instance, the real-time resource transmission system may be configured to interrogate the data of a distributed network, such as a real-time resource transmission distributed network (like the Zelle® network) to identify and/or determine the resource storage accounts available within the network, where each resource storage account may be associated with a user account identifier. Such a user account identifier may be used by the real-time resource transmission system to determine whether the resource storage account associated with the user account identifier also has an electronic resource storage account.

Additionally, and in some embodiments, the real-time resource transmission system may interrogate the data of a database and/or an index (i.e., a resource transmission surplus index), which may have been generated by an entity or client of the real-time resource transmission system, by the system itself, and/or the like, to comprise the data of each user account and their associated resource accounts (e.g., resource advance account(s), resource storage account(s), electronic resource storage account(s), and/or the like). Thus, and in some embodiments, the database and/or index may comprise the data of the user account identifier and its associated resource account identifiers in order to determine whether a resource storage account is associated with an electronic resource storage account.

In some embodiments, and as shown in block 304, the process flow 300 may include the step of identifying, in an instance where the resource storage account is not associated with the electronic resource storage account, a resource transmission location associated with the resource advance account. By way of non-limiting example, the real-time resource transmission system may identify a resource transmission location associated with the resource advance account, where such a resource transmission location may be used for a resource transmission when an electronic resource storage account is unavailable. For instance, and where a user account does not have a real-time resource transmission distributed network account (an electronic resource storage account associated with the Zelle® network), the real-time resource transmission system may determine that another resource transmission should be used outside of the real-time resource transmission distributed network. In some embodiments, such a resource transmission may resource transmission token (such as a check, prepaid card, and/or the like), and transmit the resource transmission token to the resource transmission location. Further, and in some embodiments, the resource transmission location as used herein may refer to a geological location, such as a residential address, a current geolocation of the user, an address of a P.O. Box, a company/work address, and/or the like.

In some embodiments, and as shown in block 306, the process flow 300 may include the step of generating, based on the resource transmission location, a resource transmission token comprising the resource surplus. By way of non-limiting example, and as described above, the real-time resource transmission system may be configured to generate a resource transmission token, whereby the resource transmission token comprises the resource surplus and the resource transmission is used to zero a resource surplus. Thus, and in some embodiments where the electronic resource storage account is unavailable for the user account associated with the resource advance account with the resource surplus, the real-time resource transmission system may automatically generate the resource transmission token with the resource surplus and transmit the resource transmission token to the resource transmission location.

In some embodiments, and similar to the automatic and dynamic update to the resource advance account based on the resource transmission, the real-time resource transmission system may additionally automatically and dynamically update the resource advance account upon generation of the resource transmission token. Further, and in both embodiments, the real-time resource transmission system may additionally be configured to dynamically generate and/or update a graphical user interface of a user device associated with the user account of the resource advance account (e.g., such as the user device of the user for the user account and/or a client device of the client associated with the user account), by generating a resource transmission user interface component comprising the data of the resource transmission (resource transmission and/or resource transmission token) and whether the resource transmission has been completed (e.g., received at the electronic resource storage account and/or received at the resource transmission location). Thus, the resource transmission user interface component may be transmitted from the real-time resource transmission system to the intended user device over a network, such as network 110 of FIG. 1A, to dynamically update the graphical user interface (GUI) of the user with an update of whether the resource surplus has been zeroed for the resource advance account.

In some embodiments, and as shown in block 308, the process flow 300 may include the step of transmitting the resource transmission token to the resource transmission location. In some embodiments, the real-time resource transmission system may transmit the resource transmission token to the resource transmission location once the resource transmission token has been generated and the resource transmission location has been identified.

Additionally, and in some embodiments, the real-time resource transmission system may automatically and dynamically update a database and/or index (i.e., a resource transmission surplus index) comprising the user account identifier and its associated resource accounts (and resource account identifiers) based on the resource transmission(s) (e.g., resource transmission to the electronic resource storage account and/or resource transmission token to the resource transmission location(s)). Thus, and indeed, such an automatic and dynamic updating to a database and/or index may be used by the real-time resource transmission system to improve overall processing speeds by allowing less processing components to be needed for processing and transmitting the resource transmissions and by allowing greater organization of data which may have previously required greater interrogation of larger databases across multiple storage components.

FIG. 4 illustrates a process flow 400 for determining whether a resource transmission token has been generated or generating a resource transmission token, in accordance with an embodiment of the invention. In some embodiments, a system (e.g., similar to one or more of the systems described herein with respect to FIGS. 1A-1C) may perform one or more of the steps of process flow 400. For example, a real-time resource transmission system (e.g., the system 130 described herein with respect to FIG. 1A-1C) may perform the steps of process flow 400.

In some embodiments, and as shown in block 402, the process flow 400 may include the step of determining whether a resource surplus transmission index comprising the resource advance account has been generated. In some embodiments, the real-time resource transmission system may determine whether a resource surplus transmission index has been previously generated and comprises a resource advance account (resource advance account identifier) and associated data. For instance, the real-time resource transmission system may be configured to interrogate the resource surplus transmission index(es) already generated to determine whether a particular resource advance account identifier is present on the resource surplus transmission index(es), where the resource advance account identifier that is interrogated is based on the presence of a resource surplus for the resource advance account. In some embodiments, and where at least one resource surplus transmission index associated with the real-time resource transmission system does not comprise the resource advance account (resource advance account identifier), the real-time resource transmission system may generate a new resource surplus transmission index and/or update a pre-existing resource surplus transmission index with the resource advance account.

In some embodiments, and as shown in block 404, the process flow 400 may include the step of updating, in an instance where the resource surplus transmission index comprising the resource advance account has been generated, the resource surplus transmission index with the resource transmission based on the resource surplus. For instance, the real-time resource transmission system may update a previously generated resource surplus transmission index with the resource transmission, whereby the previously generated surplus transmission index already comprises the associated resource advance account (resource advance account identifier). Thus, and by way of non-limiting example, the real-time resource transmission system may update the resource surplus transmission index that already comprises the resource advance account (resource advance account identifier) with each resource transmission associated with the resource advance account, which may comprise data regarding the resource transmissions. Such data may comprise a timestamp of when the resource transmission was sent, what kind of resource transmission was transmitted (e.g., electronic resource transmission, resource transmission token, and/or the like), to which resource storage account (e.g., electronic resource storage account) and/or to which resource transmission location, and/or the like.

In some embodiments, and as shown in block 406, the process flow 400 may include the step of generating, in an instance where the resource surplus transmission index comprising the resource advance account has not been generated, the resource surplus transmission index with the resource transmission based on the resource surplus. In some embodiments, the real-time resource transmission system may determine that there is no previously generated resource surplus transmission index comprising the resource advance account (resource advance account identifier) and may—in response to this determination-generate a new resource surplus transmission index with a resource advance account (resource advance account identifier) and the data regarding the (current and/or future) resource transmission(s). In this manner, the resource surplus transmission index may comprise a complete listing of data associated with each resource transmission based on each resource surplus for the resource advance account(s).

In some embodiments, the real-time resource transmission system may additionally and/or alternatively generate and/or update a resource transmission database with the data regarding each of the resource transmissions and the resource advance account (resource advance account identifier(s)).

In some embodiments, and as shown in block 408, the process flow 400 may include the step of accessing at least one of the resource surplus transmission index or a resource transmission database. For instance, the real-time resource transmission system may access at least one of the resource surplus transmission index and/or the resource transmission database to interrogate the data of the resource surplus transmission index and/or the resource transmission database, such as the data regarding the resource transmission(s) associated with the resource advance account(s).

In some embodiments, and where the real-time resource transmission system cannot access a resource surplus transmission index or the resource transmission database, the real-time resource transmission system may data mine the raw data regarding the resource transmissions associated with a particular entity and the associated resource advance accounts to identify the data regarding the resource transmissions of a particular resource advance account.

In some embodiments, and as shown in block 410, the process flow 400 may include the step of determining, based on accessing at least one of the resource surplus transmission index or a resource transmission database, whether a resource transmission token has been generated for the resource surplus. For instance, the real-time resource transmission system may determine whether a resource transmission token for the resource surplus of the resource advance account has already been generated and/or transmitted to the user associated with the resource advance account. In some embodiments, the process described herein with respect to blocks 402-410 may occur before the process described with respect to blocks 212-218. Thus, and by way of non-limiting example, the real-time resource transmission system may determine whether a resource transmission token has already been generated and/or transmitted for the resource surplus before determining whether an electronic resource storage account is associated with the resource advance account and before transmitting the electronic resource transmission.

In some embodiments, and as shown in block 412, the process flow 400 may include the step of halting, in an instance where the resource transmission token has been generated for the resource surplus, the initiation of the resource transmission to the electronic resource storage account. For instance, the real-time resource transmission system may halt and/or stop the initiation of the resource transmission to the electronic resource storage account when a resource transmission token has already been generated and/or transmitted. In some embodiments, the real-time resource transmission system may not even start the process described with respect to blocks 212-218 once the real-time resource transmission system has determined that a resource transmission token for the resource surplus has already been generated and/or transmitted.

In some embodiments, and as shown in block 414, the process flow 400 may include the step of allowing, in an instance where the resource transmission token has not been generated for the resource surplus, the initiation of the resource transmission to the electronic resource storage account. For instance, the real-time resource transmission system may allow the resource transmission to the electronic resource storage account when the real-time resource transmission system has determined that the resource transmission token has not been generated and/or transmitted. In some embodiments, the real-time resource transmission system may start the process described with respect to blocks 212-218 once the real-time resource transmission system has determined that a resource transmission token for the resource surplus has not been generated and/or transmitted.

FIG. 5 illustrates a process flow 500 for initiating the resource transmission to the electronic resource storage account, in accordance with an embodiment of the invention. In some embodiments, a system (e.g., similar to one or more of the systems described herein with respect to FIGS. 1A-1C) may perform one or more of the steps of process flow 500. For example, a real-time resource transmission system (e.g., the system 130 described herein with respect to FIG. 1A-1C) may perform the steps of process flow 500.

In some embodiments, and as shown in block 502, the process flow 500 may include the step of generating, based on the resource surplus being associated with the resource advance account for the pre-determined threshold period, a resource training trigger for the resource surplus. For instance, the real-time resource transmission system may determine whether the resource surplus has been associated within the resource advance account for a pre-determined threshold period, and upon this determination, the real-time resource transmission system may generate a resource transmission trigger for the resource surplus. In some embodiments, the resource transmission trigger may be the trigger received and/or identified by the real-time resource transmission system at block 206, which comprises the data of the resource surplus.

In some embodiments, the pre-determined threshold period may be set by a client of the real-time resource transmission system (e.g., a financial institution associated with the resource advance account), by a manager of the real-time resource transmission system, by the real-time resource transmission system itself, and/or the like. In some embodiments, the pre-determined threshold period may comprise, but is not limited to, a period of 28 days, 30 days, 31 days, 60 days, 90 days, and/or the like.

In some embodiments, and as shown in block 504, the process flow 500 may include the step of initiating, based on the resource transmission trigger, the resource transmission to the electronic resource storage account. For instance, the real-time resource transmission system may initiate the resource transmission to the electronic resource storage account once the resource surplus has been associated with the resource advance account for the pre-determined threshold period (e.g., 90 days). In some embodiments, the initiation of the resource transmission to the electronic resource storage account of block 504 may start the process described with respect to blocks 212-218 of FIG. 2.

In some embodiments, and where the real-time resource transmission system determines that there is no electronic resource storage account associated with the resource advance account, the real-time resource transmission system may generate the resource transmission token (as discussed with respect to FIG. 4) once the pre-determined threshold period has been met.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for implementing real-time resource transmissions based on a trigger, the system comprising:

a memory device with computer-readable program code stored thereon;

at least one processing device, wherein executing the computer-readable code is configured to cause the at least one processing device to perform the following operations:

identify a resource advance account;

extract, via data mining from a database associated with a resource advance entity. resource advance account data comprising at least a resource advance account identifier and a user account identifier, wherein the resource advance account data is in a data format that corresponds to the database;

convert the extracted resource advance account data from the data format into a standardized data format for storage in a resource surplus transmission index;

identify a resource surplus associated with the resource advance account;

identify, based on the resource surplus, a trigger comprising data of the resource surplus;

determine whether the resource advance account is associated with a resource storage account, wherein, in an instance where the resource advance account is associated with the resource storage account, identify the resource storage account;

determine, in response to identifying the resource storage account, whether the resource storage account is associated with an electronic resource storage account, wherein, in an instance where the resource storage account is associated with the electronic resource storage account, identify an electronic resource storage account identifier;

initiate, based on the identification of the electronic resource storage account identifier, a resource transmission based on the resource surplus to the electronic resource storage account associated with the electronic resource storage account identifier;

determine whether a resource surplus transmission index comprising the resource advance account has been generated, wherein, in an instance where the resource surplus transmission index comprising the resource advance account has been generated, update the resource surplus transmission index with the resource transmission based on the resource surplus, or wherein, in an instance where the resource surplus transmission index comprising the resource advance account has not been generated, generate the resource surplus transmission index with the resource transmission based on the resource surplus;

access at least one of the resource surplus transmission index or a resource transmission database, wherein the resource surplus transmission index comprises the resource transmission based on the resource surplus; and determine, based on accessing at least one of the resource surplus transmission index or a resource transmission database, whether a resource transmission token has been generated for the resource surplus, wherein, in an instance where the resource transmission token has been generated for the resource surplus, halt the initiation of the resource transmission to the electronic resource storage account, or wherein, in an instance where the resource transmission token has not been generated for the resource surplus, allow the initiation of the resource transmission to the electronic resource storage account.

2. The system of claim 1, wherein the computer-readable code is configured to cause the at least one processing device to perform the following operations:

determine, in response to identifying the resource storage account, whether the resource storage account is associated with an electronic resource storage account, wherein, in an instance where the resource storage account is not associated with the electronic resource storage account, identify a resource transmission location associated with the resource advance account;

generate, based on the resource transmission location, a resource transmission token comprising the resource surplus; and transmit the resource transmission token to the resource transmission location.

3. The system of claim 1, wherein the computer-readable code is configured to cause the at least one processing device to perform the following operations:

automatically, based on the resource transmission based on the resource surplus, update the resource advance account.

4. The system of claim 1, wherein the resource surplus is associated with the resource advance account for a pre-determined threshold period.

5. The system of claim 4, wherein the computer-readable code is configured to cause the at least one processing device to perform the following operations:

generate, based on the resource surplus being associated with the resource advance account for the pre-determined threshold period, a resource transmission trigger for the resource surplus; and initiate, based on the resource transmission trigger, the resource transmission to the electronic resource storage account.

6. The system of claim 1, wherein the resource advance account and the resource storage account are operated by an entity.

7. A computer program product for implementing real-time resource transmissions based on a trigger, wherein the computer program product comprises at least one non-transitory computer-readable medium having computer-readable program code portions embodied therein, the computer-readable program code portions which when executed by a processing device are configured to cause the processor to perform the following operations:

identify a resource advance account;

extract, via data mining from a database associated with a resource advance entity, resource advance account data comprising at least a resource advance account identifier and a user account identifier, wherein the resource advance account data is in a data format that corresponds to the database;

convert the extracted resource advance account data from the data format into a standardized data format for storage in a resource surplus transmission index;

identify a resource surplus associated with the resource advance account;

identify, based on the resource surplus, a trigger comprising data of the resource surplus;

determine whether the resource advance account is associated with a resource storage account, wherein, in an instance where the resource advance account is associated with the resource storage account, identify the resource storage account;

determine, in response to identifying the resource storage account, whether the resource storage account is associated with an electronic resource storage account, wherein, in an instance where the resource storage account is associated with the electronic resource storage account, identify an electronic resource storage account identifier;

initiate, based on the identification of the electronic resource storage account identifier, a resource transmission based on the resource surplus to the electronic resource storage account associated with the electronic resource storage account identifier;

determine whether a resource surplus transmission index comprising the resource advance account has been generated, wherein, in an instance where the resource surplus transmission index comprising the resource advance account has been generated, update the resource surplus transmission index with the resource transmission based on the resource surplus, or wherein, in an instance where the resource surplus transmission index comprising the resource advance account has not been generated, generate the resource surplus transmission index with the resource transmission based on the resource surplus;

access at least one of the resource surplus transmission index or a resource transmission database, wherein the resource surplus transmission index comprises the resource transmission based on the resource surplus; and determine, based on accessing at least one of the resource surplus transmission index or a resource transmission database, whether a resource transmission token has been generated for the resource surplus, wherein, in an instance where the resource transmission token has been generated for the resource surplus, halt the initiation of the resource transmission to the electronic resource storage account, or wherein, in an instance where the resource transmission token has not been generated for the resource surplus, allow the initiation of the resource transmission to the electronic resource storage account.

8. The computer program product of claim 7, wherein the processing device is configured to cause the processor to perform the following operations:

determine, in response to identifying the resource storage account, whether the resource storage account is associated with an electronic resource storage account, wherein, in an instance where the resource storage account is not associated with the electronic resource storage account, identify a resource transmission location associated with the resource advance account;

generate, based on the resource transmission location, a resource transmission token comprising the resource surplus; and transmit the resource transmission token to the resource transmission location.

9. The computer program product of claim 7, wherein the processing device is configured to cause the processor to perform the following operations:

automatically, based on the resource transmission based on the resource surplus, update the resource advance account.

10. The computer program product of claim 7, wherein the resource surplus is associated with the resource advance account for a pre-determined threshold period.

11. The computer program product of claim 10, wherein the processing device is configured to cause the processor to perform the following operations:

generate, based on the resource surplus being associated with the resource advance account for the pre-determined threshold period, a resource transmission trigger for the resource surplus; and initiate, based on the resource transmission trigger, the resource transmission to the electronic resource storage account.

12. A computer implemented method for implementing real-time resource transmissions based on a trigger, the computer implemented method comprising:

identifying a resource advance account;

extracting, via data mining from a database associated with a resource advance entity. resource advance account data comprising at least a resource advance account identifier and a user account identifier, wherein the resource advance account data is in a data format that corresponds to the database;

converting the extracted resource advance account data from the data format into a standardized data format for storage in a resource surplus transmission index;

identifying a resource surplus associated with the resource advance account;

identifying, based on the resource surplus, a trigger comprising data of the resource surplus;

determining whether the resource advance account is associated with a resource storage account, wherein, in an instance where the resource advance account is associated with the resource storage account, identifying the resource storage account;

determining, in response to identifying the resource storage account, whether the resource storage account is associated with an electronic resource storage account, wherein, in an instance where the resource storage account is associated with the electronic resource storage account, identifying an electronic resource storage account identifier;

initiating, based on the identification of the electronic resource storage account identifier, a resource transmission based on the resource surplus to the electronic resource storage account associated with the electronic resource storage account identifier;

determine whether a resource surplus transmission index comprising the resource advance account has been generated, wherein, in an instance where the resource surplus transmission index comprising the resource advance account has been generated, update the resource surplus transmission index with the resource transmission based on the resource surplus, or wherein, in an instance where the resource surplus transmission index comprising the resource advance account has not been generated, generate the resource surplus transmission index with the resource transmission based on the resource surplus;

access at least one of the resource surplus transmission index or a resource transmission database, wherein the resource surplus transmission index comprises the resource transmission based on the resource surplus; and determine, based on accessing at least one of the resource surplus transmission index or a resource transmission database, whether a resource transmission token has been generated for the resource surplus, wherein, in an instance where the resource transmission token has been generated for the resource surplus, halt the initiation of the resource transmission to the electronic resource storage account, or wherein, in an instance where the resource transmission token has not been generated for the resource surplus, allow the initiation of the resource transmission to the electronic resource storage account.

13. The computer implemented method of claim 12, further comprising:

determining, in response to identifying the resource storage account, whether the resource storage account is associated with an electronic resource storage account, wherein, in an instance where the resource storage account is not associated with the electronic resource storage account, identifying a resource transmission location associated with the resource advance account;

generating, based on the resource transmission location, a resource transmission token comprising the resource surplus; and transmitting the resource transmission token to the resource transmission location.

14. The computer implemented method of claim 12, further comprising:

automatically, based on the resource transmission based on the resource surplus, updating the resource advance account.

15. The computer implemented method of claim 12, wherein the resource surplus is associated with the resource advance account for a pre-determined threshold period.

* * * * *